United States Patent [19]

Kerr

[11] Patent Number: 4,659,989

[45] Date of Patent: Apr. 21, 1987

[54] INDUCTIVELY BALANCED METAL DETECTOR CIRCUIT WITH ORTHOGONAL BALANCING SIGNALS AND INCLUDING PHASE AND POLARITY DETECTION

[75] Inventor: Bruce G. Kerr, Amersham, United Kingdom

[73] Assignee: Goring Kerr Limited, United Kingdom

[21] Appl. No.: 789,547

[22] Filed: Oct. 21, 1985

Related U.S. Application Data

[62] Division of Ser. No. 347,228, Feb. 9, 1982, Pat. No. 4,563,645.

[30] Foreign Application Priority Data

Feb. 9, 1981 [GB] United Kingdom ................ 8103943

[51] Int. Cl.$^4$ ...................... G01N 27/72; G01R 33/12
[52] U.S. Cl. .................................... 324/233; 324/225; 324/239
[58] Field of Search ............... 324/225, 233, 239, 240, 324/243, 326, 329, 334; 340/551; 361/180

[56] References Cited

U.S. PATENT DOCUMENTS

| | | | |
|---|---|---|---|
| 2,744,232 | 5/1956 | Shawhan et al. | 324/233 X |
| 2,858,505 | 10/1958 | Shawhan | 324/243 |
| 2,888,026 | 5/1959 | Henderson et al. | 324/226 X |
| 3,614,600 | 10/1971 | Ronka | 324/334 X |
| 4,006,407 | 2/1977 | Flaherty et al. | 324/233 |
| 4,326,166 | 4/1982 | Pigeon et al. | 324/233 X |
| 4,331,920 | 5/1982 | Kalisch et al. | 324/225 |

OTHER PUBLICATIONS

LeGaye, E. S., Induction Balance Detector: "With Metal-Mineral Discrimination and Automatic Drift Correction Circuitry", The Electronic Metal Detector Handbook, West. Heritage Press, Sep. 1969, pp. 93-96.
Newman, J. D., Metal Detectors for Police Use, First International Electronic Crime Countermeasures Conference, Jul. 18-20, 1973 Proceedings, pp. 50-60.

Primary Examiner—Gerard R. Strecker
Attorney, Agent, or Firm—Pollock, Vande Sande & Priddy

[57] ABSTRACT

Metal detection apparatus includes an oscillator coil 101 driven by an oscillator 101, which induces in detector coils 103,104 equal and opposite E.M.F.s such that a nominally zero output is produced at terminals D.E. When metal is detected the E.M.F.s in coils 103,4 move out balance to produce a voltage at D.E., which is detected by circuit IC11 and fed to output circuits 111. Drifts in the nominally zero output at D.E. are corrected by combining quadraphase balancing signals on lines 109,110 with the detector coil output by means of amplifier IC10. The combined signal from IC10 is fed to phase sensitive detectors IC1,2 which respectively detect the quadraphase components of the combined signal from IC10. The outputs of IC1,2 are stored by capacitor circuits 112,113 and used to adjust variable capacity diode bridges 106,7 which adjust the amplitude of the balancing signals to maintain a nominally zero output from IC10 when metal is not being detected. The capacitor circuits 112,113 have a long time constant so that the balancing signals are not adjusted to cancel out the detection of metal, but circuits IC5,6,13 switches the stores 112,113 to provide a shorter time constant after metal has been detected in order to restore the circuit rapidly to a balanced condition. Additionally, the circuits IC5,6,13 disconnect the capacitor circuits from the phase sensitive detectors IC1,IC2 for a given time when metal is detected so as to restore the circuit rapidly to a balanced condition after detection of the metal.

4 Claims, 2 Drawing Figures

INDUCTIVELY BALANCED METAL DETECTOR CIRCUIT WITH ORTHOGONAL BALANCING SIGNALS AND INCLUDING PHASE AND POLARITY DETECTION

This is a divisional of U.S. Ser. No. 347,228, filed Feb. 9, 1982, now U.S. Pat. No. 4,563,645.

FIELD OF THE INVENTION

The present invention relates to metal detection apparatus and particularly to an improved circuit to be used in such apparatus.

BACKGROUND OF THE INVENTION

A known technique of metal detection involves providing relative movement between a sample and detection apparatus comprising an oscillator coil and one or more detector coils. The oscillator coil is fed with oscillatory signals and these are inductively coupled to the detector coil(s). The presence of metal in the inductive path between the oscillator coil and the detector coil is indicated by a change in the signal derived from the detector coil. In one arrangement, one oscillator coil is provided with two detector coils spaced on either side thereof and equidistant therefrom. The detector coils are connected in series such that their induced E.M.F.s are opposed. Metal passing in the vicinity of such an arrangement will cause imbalance in the combined E.M.F. induced in the detector coils. If the coils are arranged such that the samples pass through the centre of each coil in turn, the detected signal will show an imbalance of one polarity as metal passes through the inductive path between the oscillator coil and one detector coil, and then an imbalance of the opposite polarity as the metal passes through the inductive path between the oscillator coil and the other detector coil.

A problem with this arrangement is that, because of thermal changes and changes in the properties of materials due to ageing, it is impossible to keep the E.M.F.s from the detector coils exactly in opposition. Consequently, a residual voltage appears which, if large enough, will cause any following circuits to be overloaded. Compensation for this voltage can be effected by subtracting from the residual voltage until it is balanced to zero. One of the problems with such balancing is that during the period that the detector circuit is responding to effect a measurement, the balancing mechanism will start to correct for the error signal which is produced as representing the measurement.

SUMMARY OF THE INVENTION

The present invention provides a balancing circuit for compensating for residual voltages without substantially affecting detection of imbalance resulting from the signal representing a required measurement.

More particularly, the present invention provides metal detection apparatus including an oscillator coil, oscillator means arranged to feed oscillatory electrical signals through the oscillator coil, detector coil means inductively coupled to the oscillator coil, detection circuit means coupled to the detector coil means and arranged to detect changes of inductive coupling between the oscillator coil and the detector coil, so as to detect the presence of a metallic object, and balancing circuit means for applying balancing signals to the detection circuit means, the balancing circuit means being characterised by first and second means for producing first and second balancing signals having orthogonal phase components at the frequency of oscillation of the oscillator, signal combining means for combining said balancing signals with the signal induced in the detection coil means, control means responsive to the combined signal produced by the combining means and being arranged to store signals representative of the magnitude of orthogonal phase components in the combined signal, feedback means responsive to the signals stored by the control means and arranged to control the magnitude of the balancing signals produced by said first and second means, and means responsive to the combined signal for controlling the rate of change of the signals stored by the control means, as a function of the magnitude of at least one phase component of the combined signal.

BRIEF DESCRIPTION OF THE DRAWINGS

Features and advantages of the present invention will become apparent from the following description of an embodiment thereof when taken in conjunction with the accompanying drawings wherein.

DESCRIPTION OF PREFERRED EMBODIMENT

In the present embodiment, a voltage for compensating for the residual voltage is provided by combining two voltages with a phase difference of 90° to each other. This is because the residual voltage can be of any phase relative to the originating oscillator voltage. These two voltages are termed the "reactive" and "resistive" components. Under normal circumstances, the main component of the residual voltage is the reactive component; this is generally caused by a dimensional change in the coil arrangement, i.e. a change in position of one coil relative to the others. The resistive component tends to be produced by variations of loss factor such as might arise from a metal screen surrounding the coil arrangement, or from other factors such as moisture.

Figure 1:
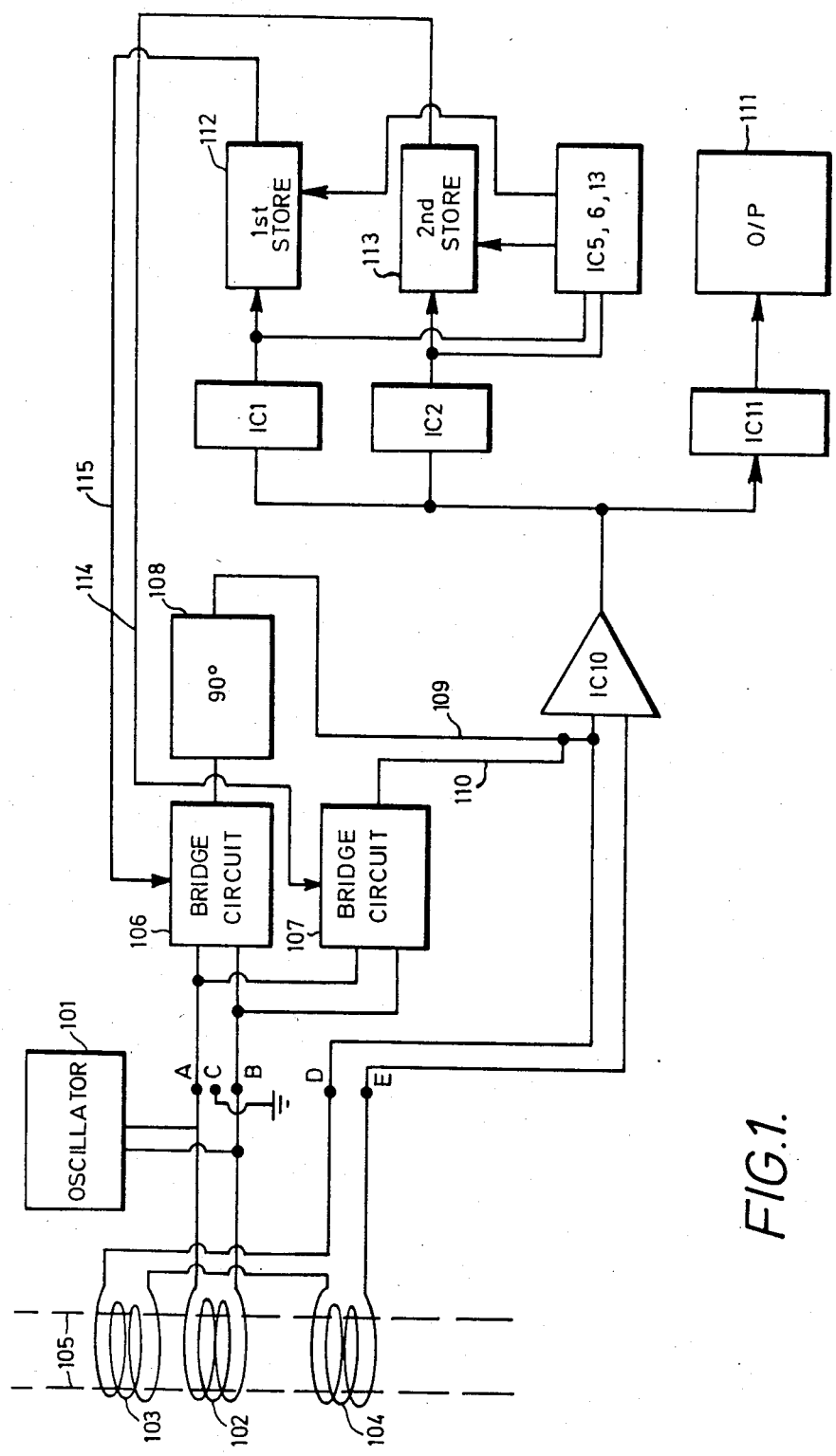
FIG. 1 is a block diagram of a metal detection apparatus according to the invention.

Referring now to FIG. 1, an oscillator 101 drives an oscillator coil 102 which is inductively coupled to detector coils 103,104 connected in series and such that the E.M.F.s induced therein are in opposition. The arrangement of coils is disposed around the path of a conveyor belt shown in hatched outline 105 typically carrying foodstuffs, so that metallic impurities in the food can be detected.

The signals developed in the oscillator and detector coils are applied to a circuit via terminals A to E. The circuit is shown in block form in FIG. 1 and is shown in more detail in FIG. 2. The oscillatory signals applied by oscillator 101 to the terminals A and B are of a balanced anti-phase nature with reference to earth, a further terminal C being arranged to receive a screen connection. Input terminals D, E are arranged to receive the output of the series-connected detector coils 103,104 including any residual drift voltage together with the detection signals.

The oscillatory signal from terminals A and B is applied to first and second bridge circuits 106,7 the balances of which are adjustable by means of a feedback loop to be described later. An output is taken across a diagonal of each of the bridges, and the output from bridge 106 is fed through a 90° phase shifter circuit 108.

Thus there is developed on lines 109,110 first and second balancing signals which are of the same frequency as the oscillator 101, the balancing signals being in phase quadrature.

These balancing signals are combined with the output of the detection coils 103,104 by combining means in the form of an operational amplifier IC10 and the amplitudes of the balancing signals are selected to cancel out any long term drifts in the output of the detector coils.

The output of the amplifier IC10 is applied to three balanced demodulators which act as phase sensitive detectors, namely circuits IC1,2 and 11. Circuit IC11 develops an output when metal is detected. The circuit is fed with a reference signal at the frequency of the oscillator 101 (by means not shown in FIG. 1). The phase of reference signal is selected depending on the type of metal to be detected. The circuit IC11 thus develops a voltage level which increases when the balance of signals induced in the detector coils 103,4 is disturbed by a metallic object on the conveyor belt. The output of IC11 is fed to output circuits 111 to be described in more detail hereinafter with reference to FIG. 2.

The phase sensitive detectors IC1, IC2 are fed with reference signals that are respectively in phase and 90° out of phase with the oscillator 101. The voltage levels produced at the outputs of the circuits IC1,2 are stored by storage capacitor circuits 112,113 and are representative of the out of balance condition of the quadra-phase components of the combined signal from IC10. The signals stored by circuits 112,113 are fed back on paths 114,115 to adjust the bridge circuits 106,7 thereby to produce suitable magnitudes for the balancing signals on lines 109,110, to balance out any long term drifts in the nominally zero output from the detector coils 103,4.

Now when a piece of metal is detected, the outputs of IC1,2 rise and a difficulty that occurs is that this voltage level, if fed back to bridge circuits 106,107 would cancel out the signal that indicates detection of the metal. To overcome this difficulty, a circuit comprising IC5,6,13 is provided to control the manner in which the signals held in stores 112,3, are updated when metal is detected. This is described in detail with reference to FIG. 2, but broadly, the store circuits are arranged to have a relatively short time constant at switch on of the circuit or after metal detection has been occurred, in order to allow the system to balance itself quickly, and then it switches to a mode wherein the store circuits have a longer time constant, so that when metal is detected, the stored signal values held by circuits 112,3 do not change rapidly so as to permit satisfactory detection of metal. Additionally a circuit is provided to prevent the store values being changed for a given time in response to metal detection, so as to hold the stored values in circuits 112,3 for a period corresponding to the expected time for the metal to move clear of the detector coils 103,104, so that system is automatically retained in its condition prior detection of the metal.

Figure 2:
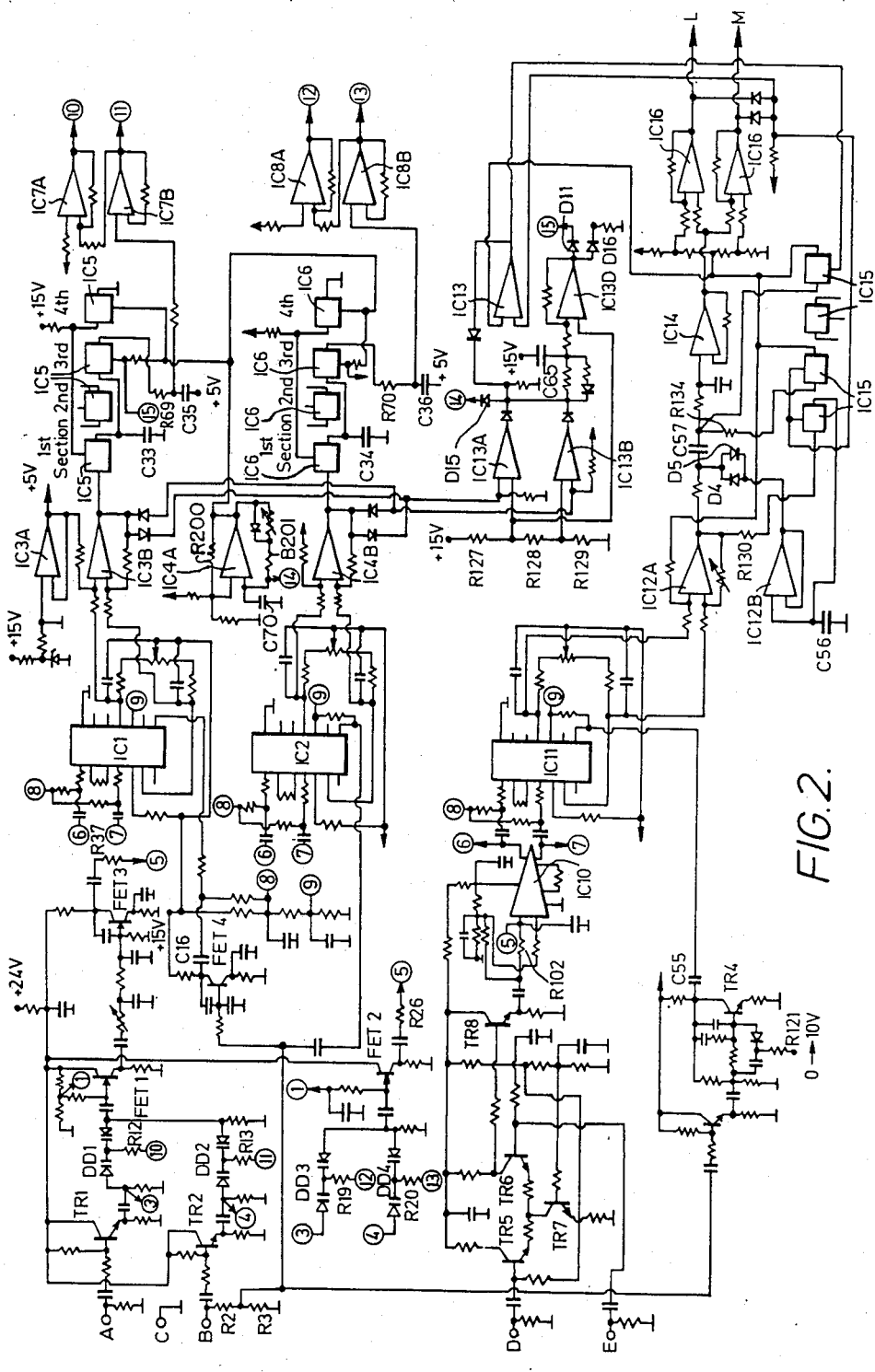
FIG. 2 is a diagram of a balancing circuit used in the apparatus shown in FIG. 1.

The detection circuit will now be described in greater detail with reference to FIG. 2.

The signals from the oscillator on terminals A and B are passed through transistors TR1 and TR2 to a bridge circuit consisting of variable capacity diode pairs DD1 and DD2, and DD3 and DD4. DD1 and DD2 form a bridge circuit, the output of which goes to FET1; DD3 and DD4 form another bridge circuit, the output of which goes to FET2. When the DC control voltage is similar on terminals 10 and 11, and 12 and 13, the bridge circuits are in balance and no signal appears on the inputs of FET1 and FET2. The use of variable capacity diode bridges is a feature of the embodiment; this particular variable bridge element providing advantageous performance over other bridge elements which can be used such as thermistors or FET's.

The output on FET1 is phase-shifted by 90° C at FET3 and the combined outputs from R26 and R37 are mixed at terminal 5 with the detector coil signal. The detector coil signal on terminals D and E is passed through a differential amplifier constituted by transistors TR5, TR6 and TR7, thence to an emitter follower transistor TR8 and a resistor R102 to terminal 5 and the input of amplifier IC10. The output of amplifier IC10, which is on terminals 6 and 7, is passed to IC1, IC2 and IC11, each of which is a balanced demodulator which converts the input signals to a DC component proportional to the AC component that is in-phase with a reference voltage fed to each demodulator. These reference voltages are obtained in the case of IC1 from a 90° phase shift circuit from FET 4 (with respect to the input at terminal B) and in the case of IC2 from an in-phase signal at the junction of R2 and R3. The reference signal for IC11 is obtained from TR4 via C55. IC1 and IC2 therefore produce DC signals proportional to the in-phase and 90° components of the outputs from FET1 and FET2. The DC output signal from demodulator IC1 is amplified by an amplifier IC3. A further amplifier IC3A is connected to provide a voltage reference for amplifier IC3B. The DC output signal from demodulator IC2 is amplified by an amplifier IC4B. The amplified signals from amplifiers IC3B and IC4B are fed to electronic switches IC5 and IC6, respectively, each having first, second, third and fourth switch sections. Switches IC5 and IC6 are operative to switch electrical charge accumulated in relatively small capacitors C33 and C34 to relatively large capacitors C35 and C36. A free-running astable multivibrator based on an amplifier IC4A is provided to control the switching of switches IC5 and IC6. The amplifier IC4A has a positive feedback loop provided by a resistor R200 and a negative feedback loop provided by a resistor R201 conncted to a timing capacitor C70. In use the output of amplifier IC4A swings to positive saturation by reason of the positive feedback loop. Charge, in the meanwhile, builds up in capacitor C70 through the negative feedback loop and when the voltage level exceeds that on the positive input of the amplifier, the amplifier swings to negative saturation and the capacitor discharges until the amplifier can swing back to positive saturation. A free-running effect is thereby produced. Assuming that IC5 and IC6 have the first and third sections switched on for both channels, the DC output will appear on capacitors C35 and C36 respectively. Capacitor C35 is connected to an amplifier IC7B connected as a voltage follower. The output of amplifier IC7B is coupled to terminal 11, and also to a DC inverting amplifier IC7A which provides an output on terminal 10. Capacitor C36 is connected to amplifier IC8B which is connected as a voltage follower. The output of amplifier IC8B is coupled to terminal 13, and also to a DC inverting amplifier IC8A which provides an output on terminal 12. These signals go respectively to the control points of the variable capacity diodes which have similar numbers via R12, R13, R19 and R20. The effect of this is that any output voltages from IC10 produce DC components on outputs 10, 11, 12 and 13 from IC7 and IC8 which almost completely cancel out the originating signals when measured at the output of IC10. Eventually if the signals fed via R102 are large enough, the control voltages on the opposed outputs of IC7 and IC8 reach values of zero and a voltage, e.g. 10 volts, which is the limiting control voltage of the variable capacity diodes. With the circuit as hereinbefore described, it would be impractical to obtain a long enough time constant via R69 and C35, and R70 and C36, for a piece of metal not to be balanced out at the speed at which it will travel through the coil arrangement because of the enormous feed back gain. A time constant of the order of half an hour would be required for effective operation. This obviously presents severe problems after switching on or after any major disturbance of the circuit. In order to overcome this, the first and third switches of IC5 and IC6 are normally switched on for a short period if the error in balance exceeds a certain amount. This is determined by a threshold circuit comprising amplifiers IC13A, IC13B, IC13C and IC13D. Amplifier IC13A is connected to the outputs of amplifiers IC3B and IC4B and provides an output at terminal 14 via diode D1 when the output from either amplifier IC3B or IC4B exceeds a predetermined amount. The output from amplifier IC13A is also provided to amplifier IC13D which, following a time delay provided by a capacitor C60, provides an output on terminal 15 via diode D11. A further amplifier IC13C provides an output to the output circuit 111 for reasons to be described. When the output from either amplifier IC3B or IC4B goes below a predetermined amount, amplifier IC13B provides an output signal and performs a similar function to amplifier IC13A. The threshold levels of amplifier IC13A and IC13B are set by a chain of resistors R127 and R129. The output provided by terminal 14 is provided to a control input of astable multivibrator IC4A to inhibit operation of the multivibrator by discharging capacitor C70. The output provided by terminal 15 holds on the third and fourth switch sections of switches IC5 and IC6, after a time delay provided by capacitor C60, this time delay being required and therefore arranged to allow for the passage of a piece of metal.

In normal use, an oscillator comprised of IC4 and its associated components causes capacitors C33 and C34 to be charged up to the output of IC3 and IC4 by switching on the first section of IC5 and IC6. When the oscillator is in its anti-phase cycle, the third switch sections of IC5 and IC6 are switched on connecting resistors R69 and R70 to capacitors C33, C34. The result of this is that a small charge from the capacitors C33 and C34 is transferred to capacitors C35 and C36. As the values of capacitors C35 and C36 are arranged to be substantially greater than C33 and C34, the ratios thereof being typically of the order of 100,000, the rate of change of the control voltage developed across C35 and C36 can be made extremely slow, not only by the ratio of the respective capacitors, but by the rate at which the oscillator section of IC4 is made to operate. At the same time, if a large piece of metal goes through the coil arrangement, initially D15 will effectively, by stopping the oscillator section of IC4, prevent any rebalance of the circuit until the time delay provided by IC13 output at D11 resets the balance. Normally this time delay is arranged to exceed the time that metal would be in the coil arrangement. The advantage of this procedure is that there is no re-balance of the circuit due to a large piece of metal which would cause the circuit not to be in the same state of balance when the metal leaves the coil arrangement as when it enters, which would inevitably result in either a temporary over-sensitive or under-sensitive situation; in other words, the circuit is restored to an identical state of balance as was present before the metal entered the coil arrangement.

Thus, in summary, when the circuit has been perturbed in response to metal detection (or upon switch on), and the voltage level at the output of IC4B rises, one of the threshold detecting amplifiers IC13 A,B is triggered to produce an output on line 14 which switches off the oscillator IC14 (upper half). Considering now the effect of this on switches IC6, the first switch section is held on, so as to connect IC4 directly to C34. The third section of IC6 is off thus isolating C36 and holding its charge as the controlling voltage to be fed back to the bridge DD3,4. After a timed delay an output is produced by IC13 via diode D11, which switches on the third section of IC6. This directly connects C36 to the output of IC4B on a continuous basis and so C36 is rapidly charged to the level of the output of IC4B. Thus, at this time, the capacitor exhibits a relatively short time constant as its voltage follows rapidly the voltage at IC4B and thus allows the system to attain balance, thereby reducing the voltage level at the output of IC4B. Furthermore, rapid balance of the system is achieved because the capacitor C36 retains its voltage level prior to the metal detection, during the timed period defined by IC13 which in most circumstances is a reasonable first approximation to an appropriate charge for the capacitor C36, to achieve balance. When the voltage at IC4B is below the threshold level of IC13A or B, the outputs at D15 and D11 cease. Thus oscillator 1C4A starts to run and the system exhibits a longer time constant as the charge on capacitor C36 follows more slowly the output at IC4B. When the oscillator IC4A is running, the first and third sections of IC6 are alternately switched thus transferring packets of charge from C34 to C36. This longer time constant can be adjusted by altering the rate of the oscillator and/or the relative capacities of C34 and C36.

The actual detection part of the circuit comprises the demodulator IC11 which obtains a reference voltage via TR4 as mentioned above, the phase of which is controlled by a voltage applied to resistor R121.

The input of the circuit including TR4 is shown as being derived from the junction of resistors R2 and R3, i.e. it is in phase with the signal applied to terminal B. It can alternatively be supplied 90° out of phase with this signal if required by, for example, taking the input to this circuit from the output capacitor C16 of FET4. A switching arrangement allows either input to be selected. This facility allows one to select the optimum mode of operation according to the product being examined and/or the most likely metal being sought.

The output from the phase detector (or demodulator) IC11 passes through an amplifier IC12A and a voltage follower circuit IC14 to a trigger circuit consisting of a pair of amplifiers IC16, AB connected to have different thresholds thereby to detect positive or negative excursions of IC12A output and provides signals indicative of these conditions on output terminals L, M. In order that the circuit does not permanently go into a positive or negative triggering state, the last stage IC14 is capacitively coupled by C57 which eliminates the DC error from IC12A. This is necessary because as the automatic balance circuits deviate over their control range, IC12A output will follow correspondingly, depending on whether its phase reference is similar to that of IC1 or IC2. In either event there will inevitably be some deviation from the normal and this will vary according to the drift error of the coil arrangement. The variation of output in IC12A, however, will still occur when metal passes through the coil arrangement and will consist of a positive and negative pulse.

Diodes D4 and D5 limit the input on C57 and prevent any excessive charge or discharge which would occur with a large piece of metal. The reference voltage for these diodes is obtained from IC12B. When either positive or negative triggering of IC16 occurs, the charging resistor R130 for capacitor C56 is disconnected via switching circuit IC15 so that the reference voltage is held at its original value and does not follow the output of IC12A once it exceeds an amount sufficient to trigger IC16. At the same time resistor R134 is also disconnected via IC15 so that no charge is lost from capacitor C57 during the passage of a large piece of metal, whereas normally without these precautions considerable current would flow from R134 and the circuit would not restore to its original state unless the positive and negative charges caused by the passage of the piece of metal were exactly equal. This could only be the case if IC12A was accurately set to the middle of its output voltage range which, as previously stated, will not occur since it will tend to deviate with the degree of drift from the coil arrangement. It is possible, however, that once the circuit has triggered at IC16, R134 being disconnected, the circuit will take a very long time to restore because no charge can flow into C57. Whilst this is beneficial during normal use, it could take several minutes to reset at the time of switching on or a substantial re-balance of the circuit. In order to overcome this, the output from the re-balance timer IC13P via D16 is arranged to switch a section of IC15 to short-circuit R134 until the circuit is re-balanced.

The circuit as shown provides output signals on terminals L, M indicative of positive and negative excursions of IC12 output as described above. A piece of metal passing through the coil arrangement will therefore provide initially a signal of one polarity, then a signal of the opposite polarity at the output of IC12. Two signals are thereby provided at output terminals L, M which differ in timing by the time required for the metal to pass from between the first detector coil and oscillator coil to between the second detector coil and oscillator coil.

This feature can be utilised to reject signals resulting from any occurrence other than the passage of metal through both detector coils of the coil arrangement. A circuit responsive only to presence of both output signals within a preset time span can be connected to terminals L, M in order to provide such a function. This may include two charging circuits, each being enabled by one of the two output signals to commence a charging or discharging operation. States of charge within preset limits may then be monitored for each circuit and a gating arrangement made responsive to both charging circuits being within these limits in order to provide an indication of a required detection. The rates of charge can be varied, e.g. by providing a variable resistance/capacitance combination to set the time constant for each circuit, and the variation may be controlled in accordance with the speed of a conveyor belt passing samples through the coil arrangement. The expected time between output pulses on terminals L,M may advantageously be varied thereby according to the speed of the belt. The output from this circuit can then be used to provide an indication of detected metal and/or to operate a suitable rejection device for rejecting any contaminated samples.

The circuit as described therefore provides operation with a time constant of variable length. This enables the circuit to cope with the various requirements, such as the ability to rebalance any residual drift and yet to detect adequately the passage of metal without commencing a re-balancing operation and thereby losing the immediately preceding state of balance.

I claim:

1. Metal detection apparatus comprising:
   an oscillator coil connected to an oscillator;
   detector coil means inductively coupled to the oscillator coil, said detector coil means including first and second detector coils disposed on opposite sides of the oscillator coil, said detector coils being electrically connected in series and in opposite polarity;
   balancing circuit means for providing balancing signals, the balancing circuit means comprising:
   (a) first and second means for producing first and second balancing signals having orthogonal phase components at the frequency of oscillation of the oscillator, each balancing signal having a magnitude controlled, respectively, by first and second feedback signals;
   (b) signal combining means coupled to said first and second means for producing first and second balancing signals and to said detector coil means for producing a combined output signal by combining said balancing signals with a signal induced in the detector coil means;
   (c) control means connected to receive said combined output signal produced by the signal combining means and including means for producing first and second signals which are a function of the magnitude of orthogonal phase components in the combined output signal and having means for storing said first and second signals; and
   (d) feedback means connected to receive the first and second signals stored by the storing means of the control means and being connected to the first and second means to control the magnitude of the balancing signals produced by said first and second means for producing first and second balancing signals;
   and detection circuit means connected to said signal combining means to receive said combined output signal for determining when the magnitude of a given phase component of the combined output signal assumes a first polarity and then an opposite polarity, whereby passage of metal between said first and second detector coils which produces changes of inductive coupling between the oscillator coil and the detector coil means is detected, said detection circuit comprising:
   a phase sensitive detector responsive to said combined output signal for comparing the phase thereof with a reference phase derived from said oscillator means;
   first voltage comparator means for comparing the output of the phase sensitive detector with a first reference voltage to determine whether said first polarity has been assumed and provide an output in response thereto;
   second voltage comparator means for comparing the output of the phase sensitive detector with a second reference voltage to determine whether said second polarity has been assumed and provide an output in response thereto; and, trigger means responsive to the occurrence of output from the first and second voltage comparator within a predetermined time interval to indicate the presence of metal.

2. Apparatus as claimed in claim 1 including a capacitive coupling between the phase sensitive detector and the trigger means, and switch means responsive to the output of the trigger means for opening a discharge path for the capacitive coupling to prevent charge loss upon actuation of the trigger means.

3. Apparatus as claimed in claim 2 including diode means for limiting the output voltage on the capacitive coupling and capacitive means coupled to the output of the phase sensitive detector for providing a voltage reference for the diode means and including a charging path from the phase sensitive detector to the capacitive means and switch means responsible to the output of the first and second comparator means for opening the discharge path.

4. Metal detector apparatus including:

an oscillator coil;

oscillator means connected to feed oscillatory electrical signals through the oscillator coil;

detector coil means inductively coupled to the oscillator coil;

balancing circuit means for providing balancing signals, the balancing circuit means comprising:

(a) first and second means for producing first and second balancing signals having orthogonal phase components at the frequency of oscillation of the oscillator, each of said first and second means comprising a bridge of two pairs of variable capacity diodes, each pair being connected in series opposition, said balancing signals having an amplitude which is controlled by first and second feedback signals;

(b) signals combining means coupled to said first and second means for producing first and second balancing signals and to said detector coil means for combining said balancing signals with the signal induced in the detector coil means;

(c) control means connected to receive the combined signal produced by the combining means and including means for producing first and second signals which are a function of the magnitude of orthogonal phase components in the combined signal, and including means for storing said first and second signals, feedback means connected to receive the first and second signals stored by the storing means of the control means and being connected to the first and second means for controlling the magnitude of the balancing signals produced by said first and second means for producing balancing signals; and detection circuit means connected to said combining means and responsive thereto for detecting the presence of metal which produces changes of inductive coupling between the oscillator coil and the detector coil means.

* * * * *